(12) United States Patent
Waris et al.

(10) Patent No.: US 10,728,378 B1
(45) Date of Patent: Jul. 28, 2020

(54) CRASH DETECTION USING SMARTPHONE SENSOR DATA

(71) Applicant: GM GLOBAL TECHNOLOGY OPERATIONS LLC, Detroit, MI (US)

(72) Inventors: Faisal Waris, Rochester Hills, MI (US); Matthew K. Titsworth, Austin, TX (US); Marco T. Carnevale, Windsor (CA); Gregory G. Macdonald, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/589,721

(22) Filed: Oct. 1, 2019

(51) Int. Cl.
| | |
|---|---|
| H04M 1/725 | (2006.01) |
| G01P 15/18 | (2013.01) |
| H04W 4/40 | (2018.01) |
| H04W 4/90 | (2018.01) |
| G07C 5/00 | (2006.01) |

(52) U.S. Cl.
CPC ......... *H04M 1/72536* (2013.01); *G01P 15/18* (2013.01); *G07C 5/008* (2013.01); *H04W 4/40* (2018.02); *H04W 4/90* (2018.02)

(58) Field of Classification Search
CPC .... H04M 1/72536; G07C 5/008; H04W 4/40; H04W 4/90; G01P 15/18
See application file for complete search history.

(56) References Cited

U.S. PATENT DOCUMENTS

| | | | |
|---|---|---|---|
| 9,925,940 B1* | 3/2018 | Christensen | ........ B60R 21/0136 |
| 9,934,625 B1* | 4/2018 | Wahba | ................ G07C 5/0808 |
| 2005/0037730 A1* | 2/2005 | Montague | ........... B60R 25/1004 |
| | | | 455/404.2 |
| 2017/0053461 A1* | 2/2017 | Pal | ........................ H04W 4/029 |

* cited by examiner

*Primary Examiner* — Marisol Figueroa

(57) ABSTRACT

A method implemented in a smartphone associated with a transportation apparatus to detect a crash of the transportation apparatus, comprises receiving a signal generated in time domain by a sensor of the smartphone in response to an event triggered by motion of the smartphone. The method further comprises transforming the signal to a delay domain to generate a two-dimensional representation of the signal in the delay domain. The method further comprises processing the two-dimensional representation using a Hough transform to select lines from the two-dimensional representation having a parameter greater than or equal to a predetermined threshold. The method further comprises determining a pattern associated with the selected lines, comparing the pattern to a predetermined pattern indicating crash event of the transportation apparatus, and determining based on the comparison whether the event indicates crash event of the transportation apparatus.

18 Claims, 8 Drawing Sheets

Window of raw sensor signal in time domain

Acceleration a(t)
Signal represented pictorially after transformation to delay coordinates $(X_t$ vs. $X_{t-1})$ Decision $(\rho_1, \Theta_1)$
$(\rho_2, \Theta_2)$
$(\rho_3, \Theta_3)$
...

Equations of extracted lines in polar coordinates

Hough Transform

Process image to extract dominant lines which capture more relevant information

CRASH DETECTION USING SMARTPHONE SENSOR DATA

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicle crash detection and more particularly to detecting crash events using smartphone sensor data.

Some vehicles are equipped with satellite-based assistance systems that can detect and respond to a crash event based on data collected from sensors in the vehicles. However, often people may use modes of transportation other than these vehicles. For example, people may share a ride, travel in a taxi, ride a motorcycle or a bicycle, and so on (collectively called other vehicles or modes of transportation). These other vehicles may not be equipped with satellite-based assistance systems. However, nowadays most people carry a smartphone when traveling. Smartphones include sensors that can detect various types of motions. These sensors can be utilized to detect crashes when people travel in these other vehicles.

SUMMARY

A system implemented in a mobile communication device associated with a transportation apparatus to detect a crash of the transportation apparatus, comprises a processor and a memory storing instructions which when executed by the processor cause the processor to receive a signal generated in time domain by a sensor of the mobile communication device in response to an event triggered by motion of the mobile communication device. The instructions cause the processor to transform the signal to a delay domain to generate a two-dimensional representation of the signal in the delay domain. The instructions cause the processor to process the two-dimensional representation to select lines from the two-dimensional representation having a parameter greater than or equal to a predetermined threshold. The instructions cause the processor to determine a pattern associated with the selected lines and to determine based on the pattern whether the event indicates crash event of the transportation apparatus.

In another feature, in response to determining that the event indicates crash event of the transportation apparatus, the instructions configure the processor to send a message to a remote server via a wireless network indicating crash event of the transportation apparatus.

In other features, the instructions configure the processor to compare the pattern associated with the selected lines to a predetermined pattern indicating crash event of the transportation apparatus and to determine that the event indicates crash event of the transportation apparatus in response to the pattern resembling the predetermined pattern.

In other features, the mobile communication device includes a smartphone, and the sensor includes an accelerometer.

In another feature, the instructions configure the processor to process the two-dimensional representation using a Hough transform.

In another feature, the predetermined threshold is based on acceleration due to gravity.

In another feature, the predetermined threshold is set to identify lines representing acceleration experienced by the mobile communication device that is greater than acceleration due to gravity.

In still other features, a method implemented in a smartphone associated with a transportation apparatus to detect a crash of the transportation apparatus, comprises receiving a signal generated in time domain by a sensor of the smartphone in response to an event triggered by motion of the smartphone. The method further comprises transforming the signal to a delay domain to generate a two-dimensional representation of the signal in the delay domain. The method further comprises processing the two-dimensional representation using a Hough transform to select lines from the two-dimensional representation having a parameter greater than or equal to a predetermined threshold. The method further comprises determining a pattern associated with the selected lines, comparing the pattern to a predetermined pattern indicating crash event of the transportation apparatus, and determining based on the comparison whether the event indicates crash event of the transportation apparatus.

In another feature, the method further comprises determining that the event indicates crash event of the transportation apparatus in response to the pattern resembling the predetermined pattern.

In another feature, the method further comprises in response to determining that the event indicates crash event of the transportation apparatus, transmitting a message from the smartphone to a remote server via a wireless network indicating crash event of the transportation apparatus.

In another feature, the sensor includes a three-axis accelerometer.

In another feature, the method further comprises selecting the predetermined threshold is based on acceleration due to gravity.

In another feature, the method further comprises setting the predetermined threshold so as to identify lines representing acceleration experienced by the smartphone that is greater than acceleration due to gravity.

In still other features, a non-transitory computer-readable medium stores instructions for execution by a processor of a mobile communication device associated with a transportation apparatus to detect a crash of the transportation apparatus. The instructions comprise first instructions for receiving a signal generated in time domain by a sensor of the mobile communication device in response to an event triggered by motion of the mobile communication device. The instructions comprise second instructions for transforming the signal to a delay domain to generate a two-dimensional representation of the signal in the delay domain. The instructions comprise third instructions for processing the two-dimensional representation using a Hough transform to select lines from the two-dimensional representation having a parameter greater than or equal to a predetermined threshold. The instructions comprise fourth instructions for determining a pattern associated with the selected lines, fifth instructions for comparing the pattern to a predetermined pattern indicating crash event of the transportation apparatus, and sixth instructions for transmitting a message from the mobile communication device to a remote server via a wireless network indicating crash event of the transportation apparatus in response to determining based on the comparison that the event indicates crash event of the transportation apparatus.

In another feature, the non-transitory computer-readable medium further comprise seventh instructions for determining that the event indicates crash event of the transportation apparatus in response to the pattern resembling the predetermined pattern indicating crash event of the transportation apparatus.

In another feature, the mobile communication device includes a smartphone, and the sensor includes a three-axis accelerometer.

In another feature, the non-transitory computer-readable medium further comprise seventh instructions for selecting the predetermined threshold is based on acceleration due to gravity.

In another feature, the non-transitory computer-readable medium further comprise seventh instructions for setting the predetermined threshold so as to identify lines representing acceleration experienced by the mobile communication device that is greater than acceleration due to gravity.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
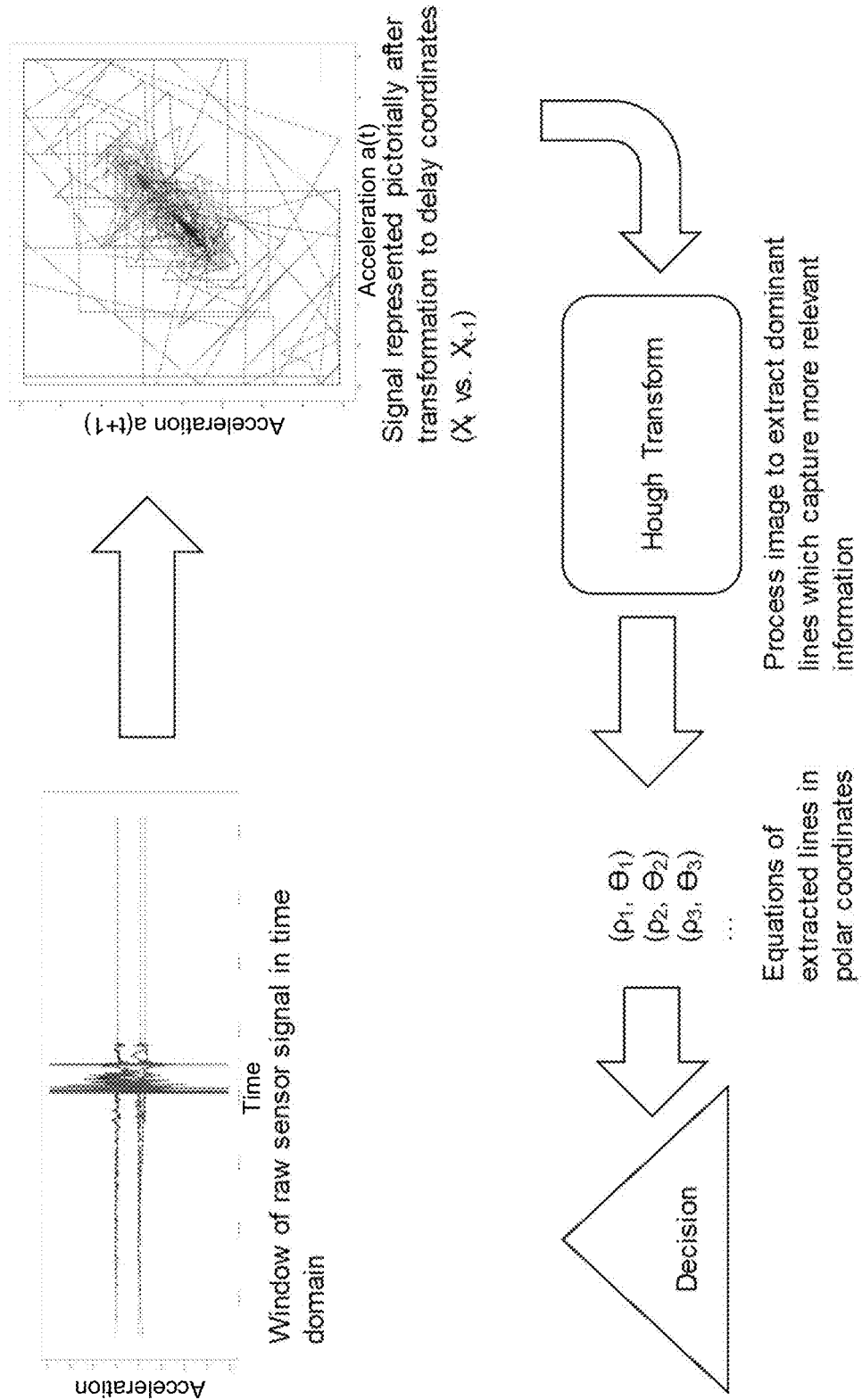
FIG. 1 shows an outline of a method for detecting a vehicle crash using data from a sensor in a smartphone according to the present disclosure.

The present disclosure relates to the detection of vehicle crashes using smartphone sensor data. The term vehicle is used in the present disclosure in a very broad sense and includes automobiles, motorcycles, bicycles, recreational vehicles, and any other mode of transportation (generally called a transportation apparatus) capable of carrying and transporting one or more persons on roadways. Further, the teachings of the present disclosure can also be applied to vehicles that can move on or in water (e.g., boats) and in the air (e.g., airplanes, drones, and so on). Furthermore, although smartphone is used as an example throughout the present disclosure, any mobile communication device having a motion sensor (e.g., an accelerometer) that can be used for crash detection according to the present disclosure, a global positioning system (GPS) for location determination, and a wireless transceiver for communication can be used instead.

The present disclosure extends the use of satellite-based assistance systems, which are typically tied to vehicles on a subscription basis, to other modes of transportation such as rideshare, taxis, motorcycles, bicycles, and so on. The extension is carried out in a tiered manner. An application running on a smartphone can pre-process data from a sensor in the smartphone to detect a crash event when a person is traveling using these other modes of transportation. The application can distinguish a crash event from other events such as falling of the phone and can thus eliminate false positives. Only when a crash event is detected, the pre-processed data is forwarded to a more robust crash determination system (e.g., a satellite-based assistance system) in a data center for further processing. In this sense, the application on the smartphone operates as a filter that weeds out false positives, qualifies a detected activity such as a crash event, and only then forwards the pre-processed data to the system in the data center for further processing. Accordingly, the application on the smartphone is a first layer or first tier in the crash determination process of the present disclosure, and the system in the data center is a second layer or second tier in the crash determination process that makes the final determination regarding a crash event based on the pre-processed data received from the smartphone.

Essentially, to detect a vehicle crash, a signal from a sensor in a smartphone (e.g., an accelerometer) is transformed initially from time-domain to delay-domain and then an image analysis method (e.g., using Hough transform) is used to extract relevant information for crash detection. To conserve battery life in smartphones, instead of using an application comprising a highly complex model, which can consume a lot of processing power and battery power of the smartphone, the present disclosure uses an application on the smartphone that provides a filter that is a computationally efficient method for detecting crashes. In conjunction with the application on the smartphone, the present disclosure uses a system at the backend (in a data center in cloud) that utilizes a complex model to further process the data that is pre-qualified by the application on the smartphone. Accordingly, the application on the smartphone approach can serve as an effective tier in a multi-tiered approach to crash detection while still providing accuracy.

Specifically, an application on a smartphone processes sensor data, selects dominant features from the processed data, and uses a trained (calibrated) logic to detect a crash. The logic is calibrated to reduce detecting false positives. The detected crash is then reported along with the location of the crash by the application on the smartphone to a cloud-based assistance service that can confirm the crash event and dispatch emergency assistance to the location of the crash. These and other features of the present disclosure are described below in detail.

Figure 2:
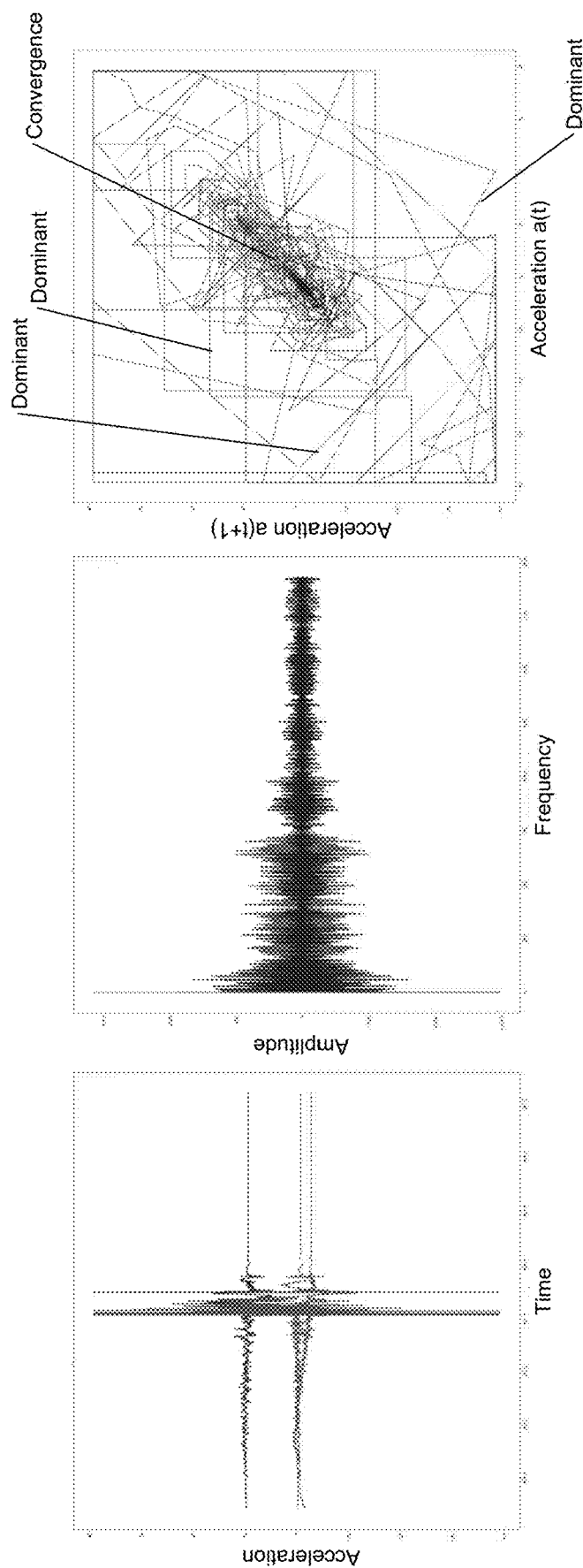
FIG. 2 shows an example of a sensor signal in time domain, frequency domain, and delay domain.

FIG. 1 shows an outline of a method for detecting a vehicle crash using data from a sensor in a smartphone according to the present disclosure. An application running on a smartphone collects raw signal data from a sensor in the smartphone that detects motion (e.g., a three-axis accelerometer). The application transforms the signal from time domain to delay domain. FIG. 2 shows an example of a sensor signal in time domain (plotted as acceleration v time), frequency domain (plotted as amplitude v frequency), and delay domain (plotted as acceleration a(t+1) v acceleration a(t)).

In delay domain, delay coordinates transform a time domain signal and provide a way of approximating a phase space representation of the system that creates the signal. If the time domain signal is of sufficient fidelity, this representation is faithful. In dynamical system theory, a phase space is a space in which all possible states of a system are represented, with each possible state corresponding to one unique point in the phase space. For mechanical systems, the phase space usually consists of all possible values of position and momentum variables.

The application includes Hough transform that further transforms the phase space representation of the sensor signal into a projective representation where the number and parameters of lines describing the sensor signal in the phase space provide actionable information. The detection of an event can be performed by observing a change in the number of connected components in the phase space, which can in turn be detected by observing a change in the number of lines needed to describe the image.

Delay coordinates provide an unstructured pictorial representation of events. In phase space, the time domain signal from the sensor is represented pictorially after transformation to delay coordinates ($X_t$ vs. $X_{t-1}$). Structured information can be extracted using Hough transform. Hough transform processes the image (i.e., the pictorial representation of the sensor signal in the phase space) to extract dominant lines that capture more relevant information about the event than other lines. For example, in FIG. 2, lines surrounding the convergence region are significantly longer than those in the convergence region and vary in length. Longer lines surrounding the convergence region capture more relevant information about the event than other lines and are therefore considered dominant. Accordingly, one way to select dominant lines is based on their length. A line is dominant if its length is greater than a predetermined length. The determination of whether a line is dominant can also be made using a predetermined threshold explained below.

Hough transform provides information in terms of line equations in polar coordinates denoted as $(\rho, \theta)$, where p denotes a distance from an origin (i.e., a point of convergence of the lines), and $\theta$ denotes an angle in radians. Thus, the raw sensor signal is transformed into structured information in terms of line equations. After extracting line equations, a trained (calibrated) logic in the application is applied to distinguish crashes from non-crashes.

Figure 3:
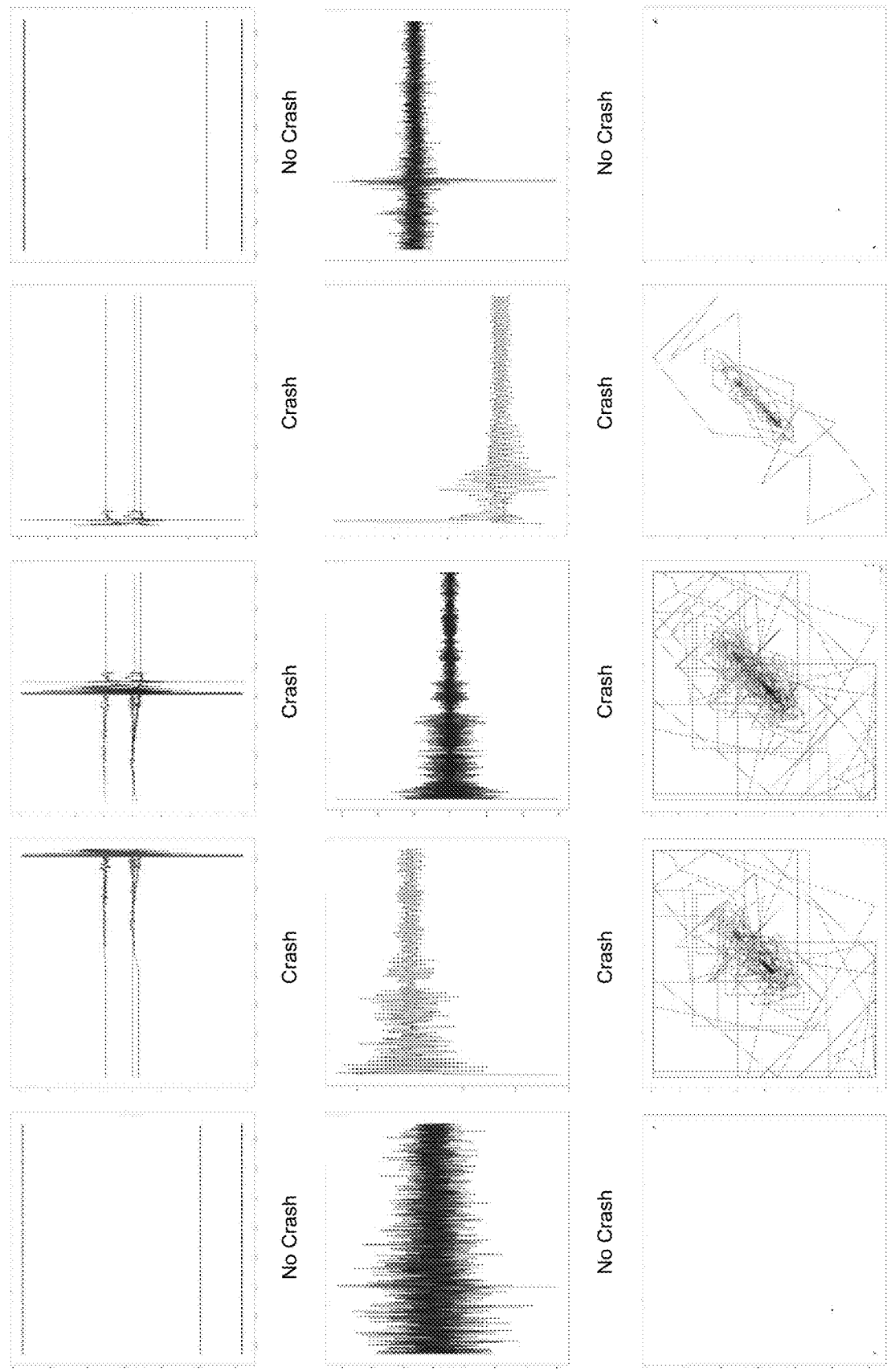
FIG. 3 shows various examples of signals output by a sensor in a smartphone in time, frequency, and delay domains in response to events including a crash event and a non-crash event.

FIG. 3 shows various examples of signals output by a sensor (e.g., a 3-axis accelerometer) in a smartphone in response to an event or a non-event. The top row shows the signals in time domain (shown as T; each graph shows the signal plotted as acceleration v time). The middle row shows the signals in frequency domain (shown as F; each graph shows the signal plotted as amplitude v frequency). The bottom row shows the signals in delay domain (shown as D; each graph shows the signal plotted as acceleration a(t+1) v acceleration a(t)). For a crash event, the time and frequency domain signals show that physical changes occur within the sensors before and after the event. In the delay space, the shape of the signal changes when an event occurs. In particular, the three distinct areas for each sensor channel (e.g., the sensor signals along the three axes of the accelerometer) converge as the sensor shakes during the event.

Figure 4:
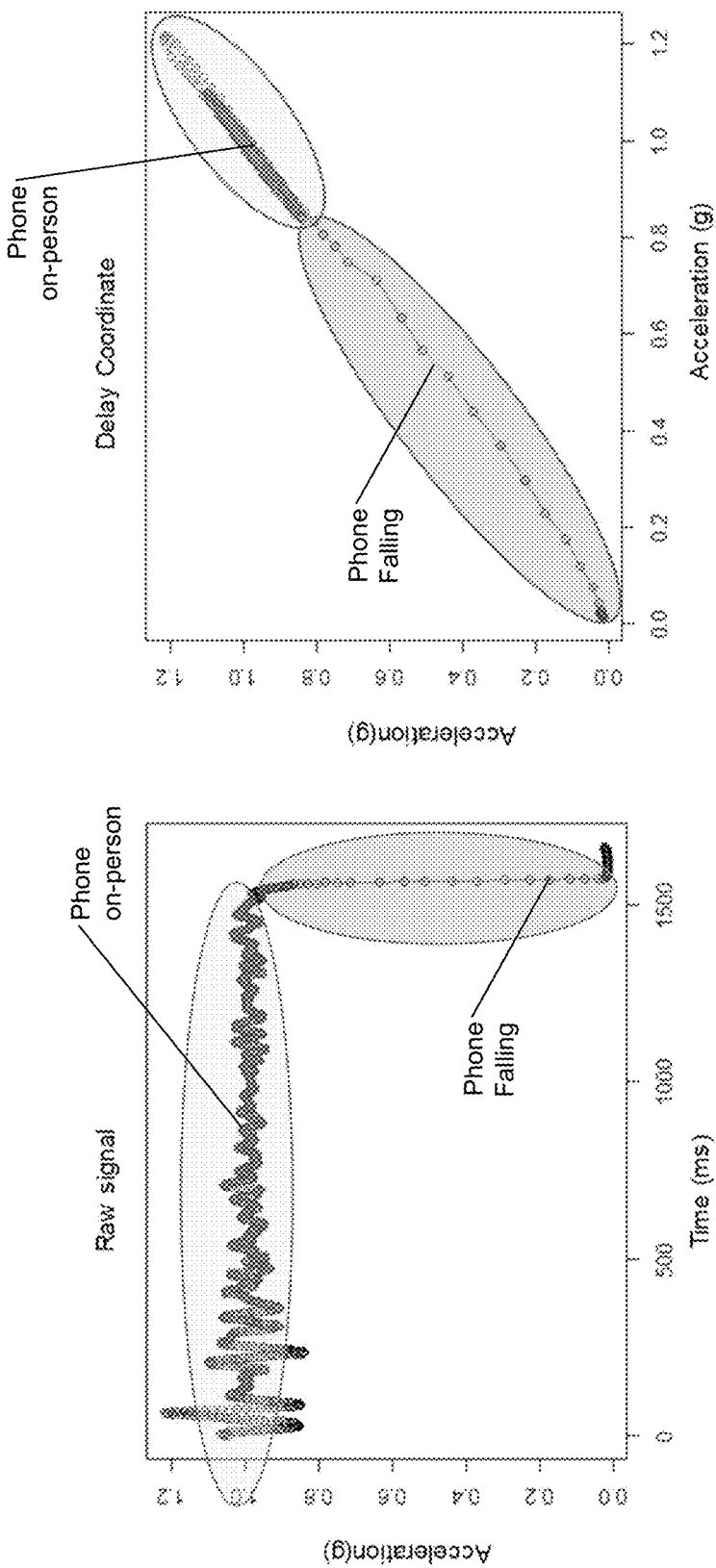
FIG. 4 shows an example of a raw signal from the sensor in time domain on the left hand side and a transformed signal in delay domain on the right hand side when a phone falls (e.g., from a person's hand to the floor of the vehicle)

The logic in the application can be trained to distinguish crashes from other events such as the smartphone falling from a person's body, for example. FIG. 4 shows an example of a raw signal from the sensor in time domain on the left hand side and a transformed signal in delay domain on the right hand side when a phone falls (e.g., from a person's hand to the floor of the vehicle). Essentially, transforming a time domain signal into delay domain involves mapping information from the time domain signal with a delay. Accordingly, when a time domain signal is transformed into delay domain, nonlinearities in the time domain signal (see the portion of the time domain signal on the left hand side in the oval marked Phone on-person) are smoothened out (see the portion of the delay domain signal on the right hand side in the oval marked Phone on-person). Further, the logic can be trained to ignore the slight non-linearity in the delay domain representing the falling of the phone (see the portion of the delay domain signal on the right hand side in the oval marked Phone Falling). Accordingly, the falling of the phone is not detected as a crash event.

In addition, to calibrate the logic, the smartphone can be placed in a test vehicle, and a crash event can be simulated in a laboratory. Data collected from the phone sensor in the simulated crash provides a signature or pattern that can be used as a reference for qualifying data that will be collected from the phone in other events and for ascertaining whether the other events are crash events. For example, if the data collected from the phone in an event, after being preprocessed by the calibrated logic in the phone application, shows a signature or pattern that is similar to the signature or pattern obtained in the simulated crash, then the logic can determine with sufficient statistical confidence that the event is most likely a crash event and not a false positive.

In general, if a representation in delay domain of a time domain signal generated by an event is linear, the logic can be trained to ignore the event. Conversely, if a representation in delay domain of a time domain signal generated by an event is highly nonlinear, the logic can be trained to preprocess the data to determine if the event is a crash event or a false positive.

Signatures or patterns of lines (and therefore of their polar coordinates) for various crash scenarios can be empirically determined. Patterns corresponding to non-crash events like the falling of the phone can also be empirically determined. The logic can be trained to ignore the signatures or patterns corresponding to non-crash events. The logic can be trained to detect and confirm a crash event when a detected pattern resembles one of the signatures of the crash events.

For example, the falling of the phone can be distinguished from a crash event because when the phone falls, the acceleration sensed by the sensor in the phone is that due to gravity. In contrast, when a crash is sensed, the acceleration sensed is likely to be greater than that due to the gravitational force. Accordingly, the polar coordinates and the pattern of the lines in the phase space (called signature) will be very different during an actual crash than that when the phone falls. Accordingly, to detect and distinguish a crash from a non-crash event such as a fall, a predetermined threshold for comparing the line parameters (e.g., polar coordinates) and determining whether a line is dominant can be set based on the acceleration due to gravity. For example, a line may be considered dominant if its distance and/or angle is greater than that for the lines typically observed when the phone falls. Indeed, in the delay domain shown in FIG. 2, the longer lines result from and therefore indicate a far greater acceleration than gravity and therefore may be considered for determining whether the event causing the lines is a crash event.

Of course, many other criteria can be used instead of or in addition to gravity. Further, many other non-crash events (e.g., backing up a vehicle into a hard object, swerving while driving, hard braking and/or acceleration, off-roading, mountain biking, etc.) can be identified and eliminated as non-crash events using empirical data from such events and different thresholds. The predetermined threshold and the criteria are selected to not only minimize detection of false positives but also to eliminate detection of false negatives (i.e., failure to detect an actual crash event).

Thus, the logic in the phone application can be trained (calibrated) to classify each event sensed by the phone sensor as a crash event or a non-crash event based on the pattern or signature generated by the event. If the logic classifies an event as a crash event, then the pre-processed data is forwarded to the back end system for further processing, which can include confirming or validating the reported crash event in some instances and dispatching assistance to the location of the crash event.

Figure 5:
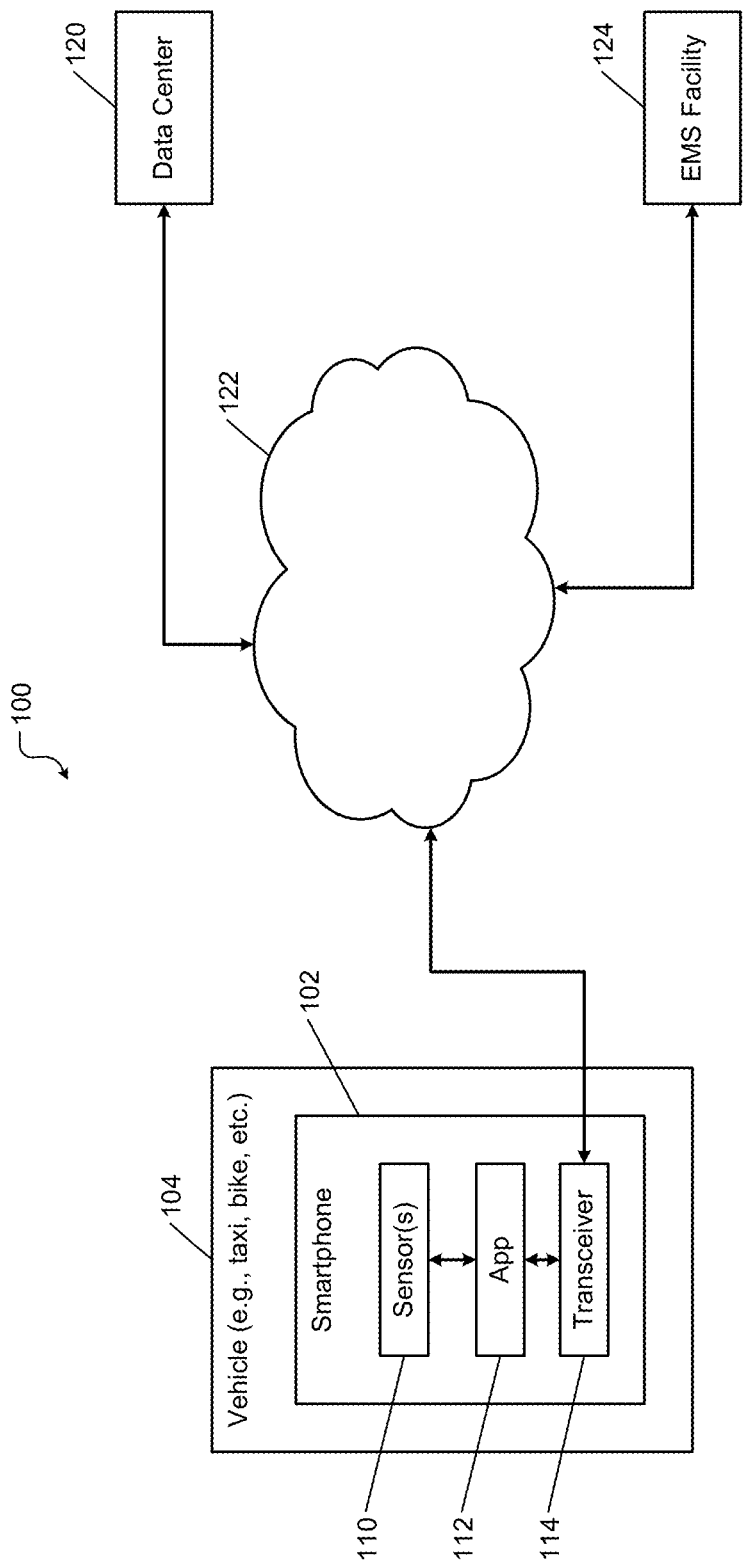
FIG. 5 shows an example of a system for detecting a vehicle crash using a smartphone sensor according to the present disclosure.

FIG. 5 shows an example of a system 100 for detecting a vehicle crash using a smartphone sensor according to the present disclosure. The system 100 comprises a smartphone 102 carried by a person traveling in a vehicle 104. For example, the vehicle 104 may include a vehicle used for sharing a ride, a taxi, a motorcycle, a bicycle, or any other vehicle that is used by the person for transportation and that is not equipped with a satellite-based assistance system used for detecting a crash event using sensors in the vehicle.

The smartphone 102 includes one or more sensors (e.g., accelerometers, a GPS device, etc.) 110, an application (app) 112, and a transceiver 114. The application 112 includes the logic (also called procedure or model) trained or calibrated as explained above to detect and distinguish a crash event from a non-crash event based on the data received from the sensor 110. The application 112 detects a crash event as already described above and further below with reference to FIG. 6.

The transceiver 114 includes a transmitter and a receiver that communicate with a data center 120 via a distributed communication system 122. For example, the distributed communication system 122 may include a cellular network, a global positioning system (GPS), or any other wireless network that the smartphone 102 can use to communicate with the data center 120.

The data center 120 may include a plurality of servers (see FIGS. 7A-7C) that process crash related data received from the smartphone 102. In the event of a crash event reported by the smartphone 102, a system running on the servers and comprising a more robust crash detection system than the application on the smartphone 102 may further process and validate the pre-qualified data received from the smartphone 102. On confirming the crash event and ascertaining the location of the crash from the GPS data or location information received from the smartphone 102, the data center 120 can communicate with an emergency management service (EMS) 124 to dispatch assistance to the crash location. The dispatching can be automatic or with human assistance.

In addition, the data center 120 can send a message to the smartphone 102 indicating that assistance is dispatched to the location of the crash event. However, occasionally, the reported crash event may be a false positive (i.e., not in fact an actual crash) or a minor crash not requiring assistance. In such situations, a person viewing the indication on the smartphone 102 that assistance is dispatched, can send another message to the data center 120. The message can indicate that the reported crash event is a false positive or a minor crash not requiring assistance, and that the data center 120 can cancel the assistance.

The servers at the data center 120 can also receive additional information that can be used to validate the reported crash event. For example, if the reported crash event turns out to be in fact true, the servers at the data center 120 can store the pattern or signature data of the reported crash, which can be used with confidence in applications deployed in other smartphones going forward. Conversely, if the reported crash turns out to be false, the servers at the data center 120 can discard or flag the pattern or signature data of the reported crash, which can then be deleted from the application 112 on the smartphone 102 and not used in applications deployed in other smartphones going forward.

Figure 6:
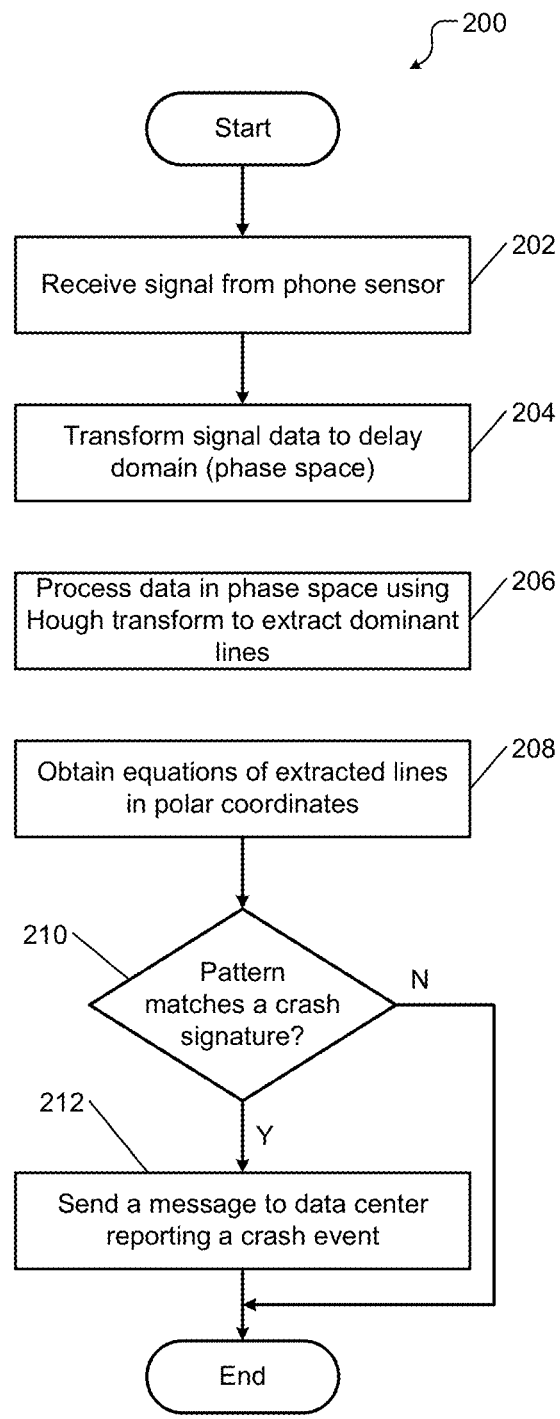
FIG. 6 shows a method for detecting a vehicle crash using a smartphone sensor according to the present disclosure.

FIG. 6 shows a method 200 for detecting a vehicle crash using a smartphone sensor according to the present disclosure. For example, the method 200 is executed by the smartphone 102. The term control used below indicates functions and operations performed by the smartphone 102.

At 202, control receives a signal from a sensor (e.g., sensor 110) in a mobile device (e.g., smartphone 102). At 204, control transforms the signal from time domain to delay domain (phase space). At 206, control processes the data (image) in the phase domain using Hough transform and extracts dominant lines (e.g., lines longer than a predetermined length or with polar coordinates greater than those for lines corresponding to gravity). For example, control determines whether a line is dominant if its polar coordinates are greater than or equal to a predetermined threshold, where the predetermined threshold is based on gravity (i.e., acceleration due to the gravitational force).

At 208, control obtains equations of extracted lines in polar coordinates. At 210, control determines, based on the polar coordinates (also called line parameters), whether a pattern or signature of the extracted lines (i.e., of the polar coordinates) matches a pattern or signature associated with one or more crash events used during calibration. Control determines that no crash event occurred and ends if the pattern or signature of the extracted lines does not match a pattern or signature associated with a crash event used during calibration.

At 212, if the pattern or signature of the extracted lines matches a pattern or signature associated with a crash event used during calibration, control determines that a crash event occurred and sends a message to a data center (e.g., element 120) reporting the detected crash event (along with associated pre-processed and qualified data pattern, location information, etc.). In response to receiving the message reporting a crash event, the data center confirms or validates the crash event and communicates with an EMS facility (e.g., element 124) to dispatch assistance to the crash location.

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

Figure 7B:
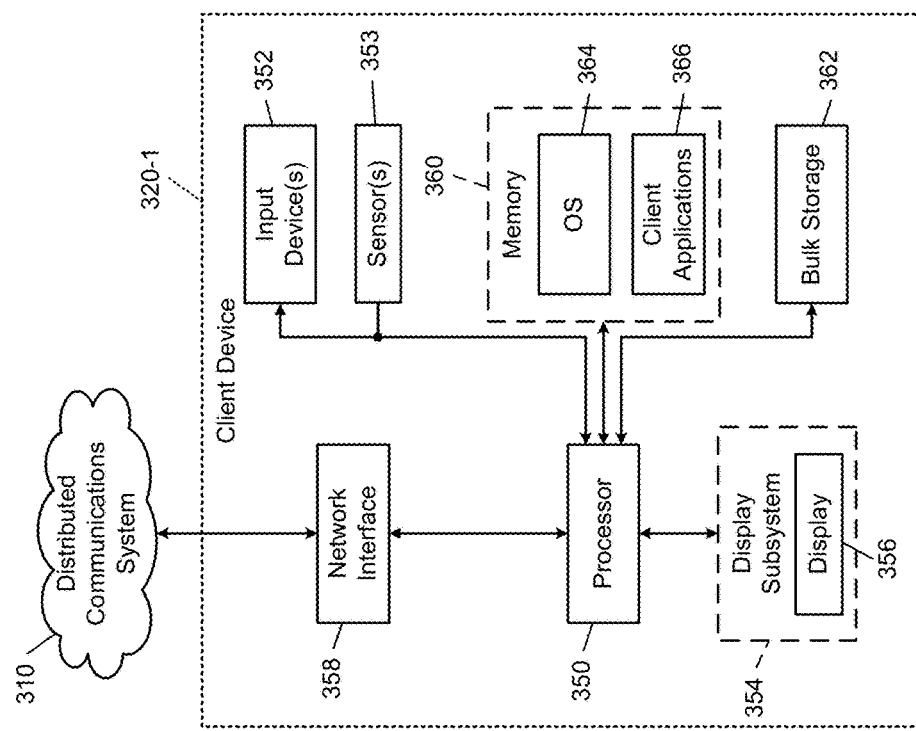
FIG. 7B shows a simplified example of a client device of the distributed computing system of FIG. 7A.
Figure 7A:
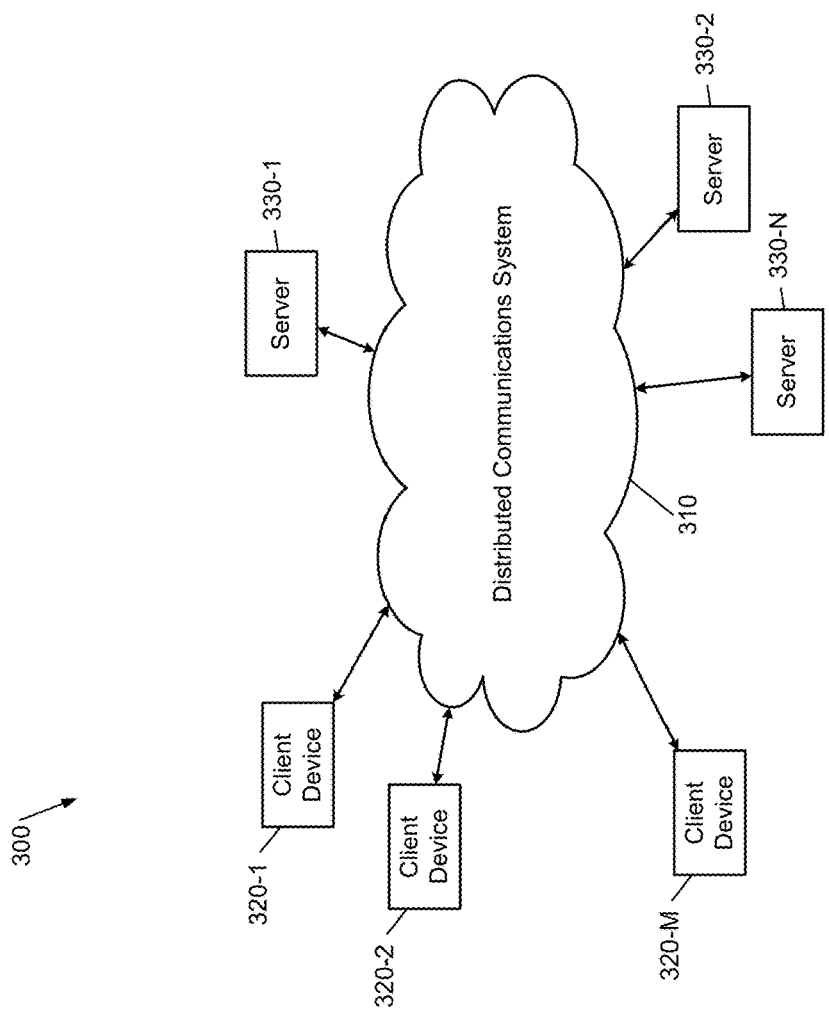
FIG. 7A shows a simplified example of a distributed computing system.

FIG. 7A shows a simplified example of a distributed computing system 300. The distributed computing system 300 includes a distributed communications system 310, one or more client devices 320-1, 320-2, . . . , and 320-M (collectively, client devices 320), and one or more servers 330-1, 330-2, . . . , and 330-N (collectively, servers 330). M and N are integers greater than or equal to one. The distributed communications system 310 may include a local area network (LAN), a wide area network (WAN) such as the Internet, or other type of network. For example, the distributed communication system 122 may be similar to the distributed communications system 310. The client devices 320 and the servers 330 may be located at different geographical locations and may communicate with each other via the distributed communications system 310. For examples the servers 330 may be located in the data center 320 in a cloud. The client devices 320 and the servers 330 may connect to the distributed communications system 310 using wireless and/or wired connections.

The client devices 320 may include smartphones (such as the smartphone 102), personal digital assistants (PDAs), tablets, laptop computers, personal computers (PCs), etc. The client devices 320 may execute software applications such as the method 300 described above. The servers 330 may provide multiple services to the client devices 320. For example, the servers 330 may execute software applications developed by one or more vendors (e.g., the backend system for crash event processing described above). The servers 330 may host multiple databases that are relied on by the software applications in providing services to users of the client devices 320.

FIG. 7B shows a simplified example of the client device 320-1. The client device 320-1 may typically include a central processing unit (CPU) or processor 350, one or more input devices 352 (e.g., a keypad, touchpad, mouse, touchscreen, etc.), one or more sensors 353 (such as sensors 310), a display subsystem 354 including a display 356, a network interface 358, memory 360, and bulk storage 362.

The network interface 358 connects the client device 320-1 to the distributed computing system 300 via the distributed communications system 310. For example, the network interface 358 may include a wired interface (for example, an Ethernet interface) and/or a wireless interface (for example, a Wi-Fi, Bluetooth, near field communication (NFC), or other wireless interface). The memory 360 may include volatile or nonvolatile memory, cache, or other type of memory. The bulk storage 362 may include flash memory, a magnetic hard disk drive (HDD), and other bulk storage devices.

The processor 350 of the client device 320-1 executes an operating system (OS) 364 and one or more client applications 366. The client applications 366 include an application that accesses the servers 330 via the distributed communications system 310.

Figure 7C:
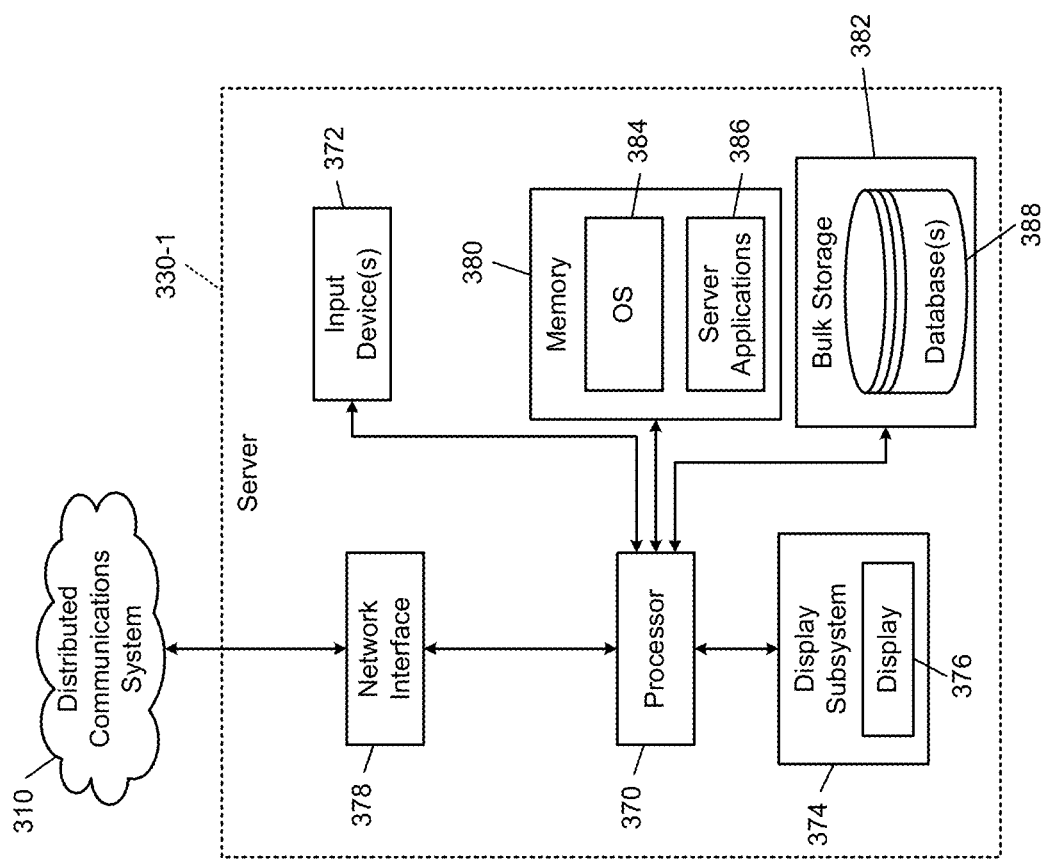
FIG. 7C shows a simplified example of a server of the distributed computing system of FIG. 7A.

FIG. 7C shows a simplified example of the server 330-1. The server 330-1 typically includes one or more CPUs or processors 370, a network interface 378, memory 380, and bulk storage 382. In some implementations, the server 330-1 may be a general-purpose server and include one or more input devices 372 (e.g., a keypad, touchpad, mouse, and so on) and a display subsystem 374 including a display 376.

The network interface 378 connects the server 330-1 to the distributed communications system 310. For example, the network interface 378 may include a wired interface (e.g., an Ethernet interface) and/or a wireless interface (e.g., a Wi-Fi, Bluetooth, near field communication (NFC), or other wireless interface). The memory 380 may include volatile or nonvolatile memory, cache, or other type of memory. The bulk storage 382 may include flash memory, one or more magnetic hard disk drives (HDDs), or other bulk storage devices.

The processor 370 of the server 330-1 executes an operating system (OS) 384 and one or more server applications 386, which may be housed in a virtual machine hypervisor or containerized architecture. The bulk storage 382 may store one or more databases 388 that store data structures used by the server applications 386 to perform respective functions.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip (SoC).

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system implemented in a mobile communication device associated with a transportation apparatus to detect a crash of the transportation apparatus, the system comprising:
   a processor; and
   a memory storing instructions which when executed by the processor cause the processor to:
      receive a signal generated in time domain by a sensor of the mobile communication device in response to an event triggered by motion of the mobile communication device;
      transform the signal to a delay domain to generate a two-dimensional representation of the signal in the delay domain;
      process the two-dimensional representation to select lines from the two-dimensional representation having a parameter greater than or equal to a predetermined threshold;
      determine a pattern associated with the selected lines; and
      determine based on the pattern whether the event indicates crash event of the transportation apparatus.

2. The system of claim 1 wherein in response to determining that the event indicates crash event of the transportation apparatus, the instructions configure the processor to send a message to a remote server via a wireless network indicating crash event of the transportation apparatus.

3. The system of claim 1 wherein the instructions configure the processor to:
   compare the pattern associated with the selected lines to a predetermined pattern indicating crash event of the transportation apparatus; and
   determine that the event indicates crash event of the transportation apparatus in response to the pattern resembling the predetermined pattern.

4. The system of claim 1 wherein the mobile communication device includes a smartphone and wherein the sensor includes an accelerometer.

5. The system of claim 1 wherein the instructions configure the processor to process the two-dimensional representation using a Hough transform.

6. The system of claim 1 wherein the predetermined threshold is based on acceleration due to gravity.

7. The system of claim 1 wherein the predetermined threshold is set to identify lines representing acceleration experienced by the mobile communication device that is greater than acceleration due to gravity.

8. A method implemented in a smartphone associated with a transportation apparatus to detect a crash of the transportation apparatus, the method comprising:
- receiving a signal generated in time domain by a sensor of the smartphone in response to an event triggered by motion of the smartphone;
- transforming the signal to a delay domain to generate a two-dimensional representation of the signal in the delay domain;
- processing the two-dimensional representation using a Hough transform to select lines from the two-dimensional representation having a parameter greater than or equal to a predetermined threshold;
- determining a pattern associated with the selected lines;
- comparing the pattern to a predetermined pattern indicating crash event of the transportation apparatus; and
- determining based on the comparison whether the event indicates crash event of the transportation apparatus.

9. The method of claim 8 further comprising determining that the event indicates crash event of the transportation apparatus in response to the pattern resembling the predetermined pattern.

10. The method of claim 8 further comprising in response to determining that the event indicates crash event of the transportation apparatus, transmitting a message from the smartphone to a remote server via a wireless network indicating crash event of the transportation apparatus.

11. The method of claim 8 wherein the sensor includes a three-axis accelerometer.

12. The method of claim 8 further comprising selecting the predetermined threshold is based on acceleration due to gravity.

13. The method of claim 8 further comprising setting the predetermined threshold so as to identify lines representing acceleration experienced by the smartphone that is greater than acceleration due to gravity.

14. A non-transitory computer-readable medium storing instructions for execution by a processor of a mobile communication device associated with a transportation apparatus to detect a crash of the transportation apparatus, the instructions comprising:
- first instructions for receiving a signal generated in time domain by a sensor of the mobile communication device in response to an event triggered by motion of the mobile communication device;
- second instructions for transforming the signal to a delay domain to generate a two-dimensional representation of the signal in the delay domain;
- third instructions for processing the two-dimensional representation using a Hough transform to select lines from the two-dimensional representation having a parameter greater than or equal to a predetermined threshold;
- fourth instructions for determining a pattern associated with the selected lines;
- fifth instructions for comparing the pattern to a predetermined pattern indicating crash event of the transportation apparatus; and
- sixth instructions for transmitting a message from the mobile communication device to a remote server via a wireless network indicating crash event of the transportation apparatus in response to determining based on the comparison that the event indicates crash event of the transportation apparatus.

15. The non-transitory computer-readable medium of claim 14 further comprising seventh instructions for determining that the event indicates crash event of the transportation apparatus in response to the pattern resembling the predetermined pattern indicating crash event of the transportation apparatus.

16. The non-transitory computer-readable medium of claim 14 wherein the mobile communication device includes a smartphone and wherein the sensor includes a three-axis accelerometer.

17. The non-transitory computer-readable medium of claim 14 further comprising seventh instructions for selecting the predetermined threshold is based on acceleration due to gravity.

18. The non-transitory computer-readable medium of claim 14 further comprising seventh instructions for setting the predetermined threshold so as to identify lines representing acceleration experienced by the mobile communication device that is greater than acceleration due to gravity.

* * * * *